US006867797B1

(12) United States Patent
Pound

(10) Patent No.: US 6,867,797 B1
(45) Date of Patent: Mar. 15, 2005

(54) ANIMATING IMAGES DURING A CALL

(75) Inventor: Phillip S. Pound, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 323 days.

(21) Appl. No.: 09/698,362

(22) Filed: Oct. 27, 2000

(51) Int. Cl.[7] .................................................. H04N 7/14
(52) U.S. Cl. ................................ 348/14.12; 348/14.01; 370/261
(58) Field of Search .......................... 348/14.01–14.03, 348/14.05, 14.08–14.09, 14.1, 14.12, 14.13, 14.14; 345/7–8, 158, 473, 522, 753; 709/204; 379/93.17, 93.21, 93.23, 202.01, 202; 370/260–261, 352, 396

(56) References Cited

U.S. PATENT DOCUMENTS

| 5,414,457 | A | * | 5/1995 | Kadowaki et al. ........ 348/14.03 |
| H1790 | H | * | 3/1999 | Coleman ................. 348/14.01 |
| 5,907,604 | A | * | 5/1999 | Hsu ....................... 379/142.06 |
| 6,052,372 | A | * | 4/2000 | Gittins et al. ............... 370/396 |
| 6,151,619 | A | * | 11/2000 | Riddle ......................... 709/204 |
| 6,313,864 | B1 | * | 11/2001 | Tabata et al. ............. 348/14.02 |
| 6,584,490 | B1 | * | 6/2003 | Schuster et al. ............ 709/200 |

FOREIGN PATENT DOCUMENTS

JP          2000307707 A  * 11/2000  .......... H04M/1/274

OTHER PUBLICATIONS

J. Postel; Request for Comments 768, "User Datagram Protocol", Aug. 28, 1980, pp. 1–3.
Information Sciences Institute, Request for Comments 791, "Internet Protocol–Darpa Internet Program, Protocol Specification," Sep. 1981, pp. 1–48.
Information Sciences Institute, Request for Comments 793, "Transmission Control Protocol–Darpa Internet Program, Protocol Specification," Sep. 1981, pp. 1–91.
H. Schulzrinne, Network Working Group, Request for Comments 1889, "RTP: A Transport Protocol for Real–Time Applications", Jan. 1996, pp. 1–69.
R. Braden, et al., Network Working Group, Request for Comments 2205, Resource ReSerVation Protocol (RSVP-)–Version 1 Functional Specification, Sep. 1997, pp. 1–109.
H. Schulzrinne, et al., Network Working Group, Request for Comments 2326, "Real Time Streaming Protocol (RTSP)," dated Apr. 1998, pp. 1–81.
M. Handley, et al., Network Working Group, Request for Comments 2327, "SDP: Session Description Protocol", Apr. 1998, pp. 1–39.
S. Deering, et al., Network Working Group, Request for Comments 2460, "Internet Protocol, Version 6 (IPv6) Specification," Dec. 1998, pp. 1–36.
M. Handley, et al., Network Working Group, Request for Comments 2543, "SIP: Session Initiation Protocol", Mar. 1999, pp. 1–153.
M. Handley, et al., Network Working Group, Request for Comments 2974, "Session Announcement Protocol," dated Oct. 2000, pp. 1–16.
Wilson, Jim, *Popular Mechanics,* "Talking Heads," dated Aug., 2000, 8 pages.

* cited by examiner

*Primary Examiner*—George Eng
(74) *Attorney, Agent, or Firm*—Trop, Pruner & Hu, P.C.

(57) ABSTRACT

A method is provided that comprises receiving an incoming call from a party and receiving calling party information associated with the incoming call. The method further comprises receiving information associated with at least one physical attribute of the party and altering at least a portion of an image associated with the calling party information based on the received information. The method comprises displaying the altered image.

24 Claims, 5 Drawing Sheets

ANIMATING IMAGES DURING A CALL

TECHNICAL FIELD

The invention relates generally to animating images of a participant during a call.

BACKGROUND

Today, voice communication is made possible through a variety of well-known means, including conventional telephones, cellular telephones, Internet phones, and the like. As these conventional means of voice communication have become reliable, there has been a steady increase in the demand for video in conjunction with voice communications.

In response to the demand for voice and video communications, designers developed video phones, such as cellular phones and Internet phones that provide both voice and video capability. Internet video phones, which offer voice and video communications over the Internet, are now technological realities. Internet video phones offer enhanced and effective communications by providing full-duplex audio and point-to-point video, all in one package.

Nowadays, it is not uncommon to find cellular phones that also provide video capability aside from the customary voice functionality. While video phones in general continue to gain popularity, they tend to be rather cost prohibitive, partly because of the often expensive video processing components that such phones require. Additionally, the popularity of video phones may be inhibited because of the large bandwidth required to transmit video signals. It is not surprising that a large bandwidth may be required for video transmission considering that a TV-quality video (in the United States) amounts to transmitting roughly 30 video frames per second.

A need thus exists for an efficient method and apparatus for providing animated images of a participant during a call.

SUMMARY

In general, according to one embodiment, a method comprises receiving an incoming call from a party and receiving calling party information associated with the incoming call. The method further comprises receiving information associated with at least one physical attribute of the party and altering at least a portion of an image associated with the calling party information based on the received information. The method comprises displaying the altered image.

Some embodiments may have one or more of the following advantages. An efficient method and apparatus are provided for participants of a telephone call to see animated images of each other while engaging in a real-time interactive voice communications. The images of each participant may be updated using lesser bandwidth than would otherwise be required for conventional video transmission.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
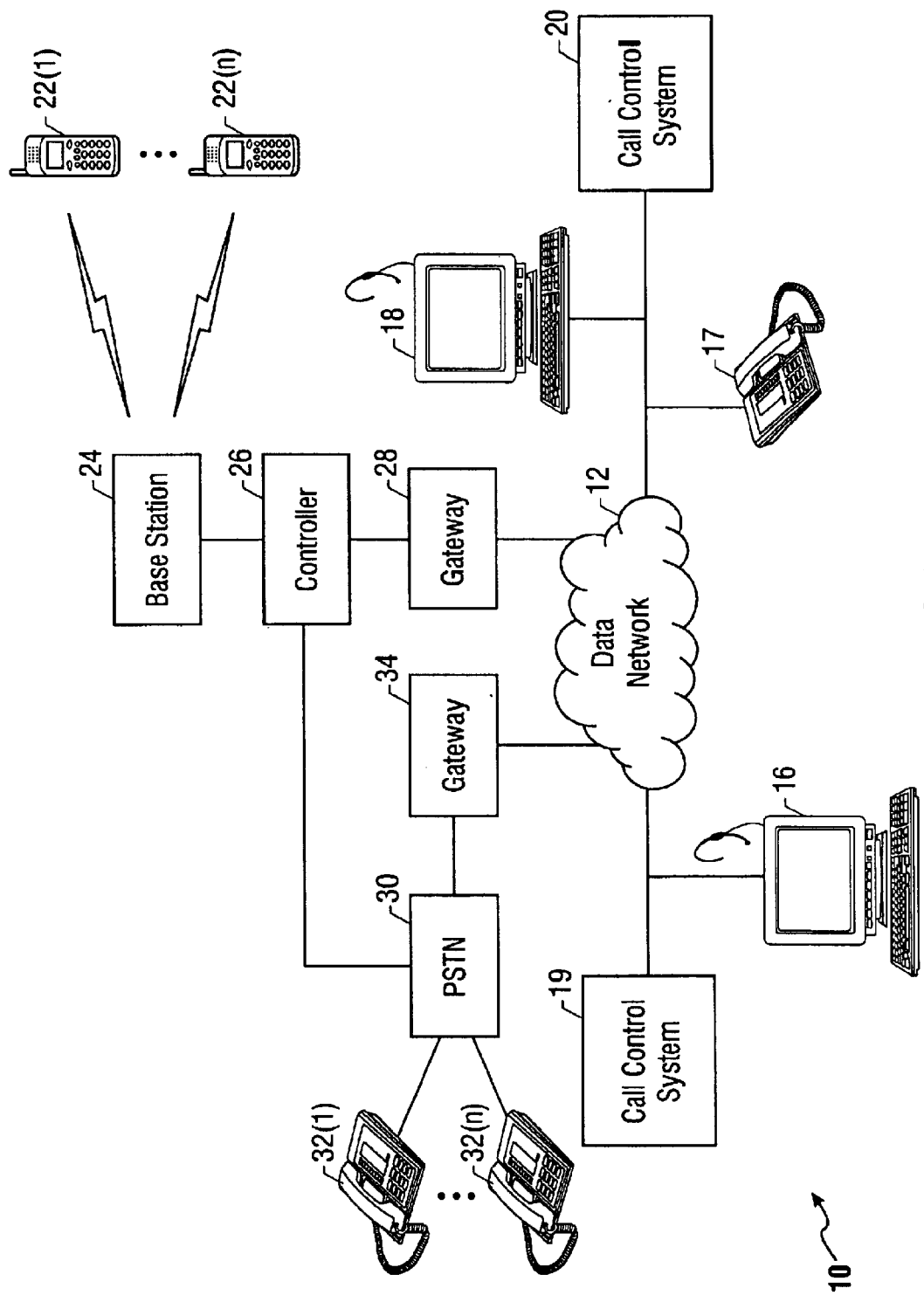
FIG. 1 is a block diagram of an embodiment of a communications system in accordance with one embodiment of the present invention.

Referring to FIG. 1, a communications system 10 includes a packet-based data network 12 that is coupled to various telecommunications devices. The data network 12 may include a public network such as the Internet or private networks such as local area networks (LANs) or wide area networks (WANs). As used here a "data network" or "network" may refer to one or more communications networks, channels, links, or paths as well as systems or devices (such as routers or switches) used to route data over such networks, channels, links, or paths.

The telecommunications devices may include devices that are capable of participating in real-time interactive call sessions over the data network 12, in one embodiment. In the exemplary arrangement of FIG. 1, the telecommunications devices may include network telephones 16, 17 and 18, which are controlled by control systems 19, 20. The call control systems 19, 20 behave as proxies for respective network telephones 16 and 17 and 18 to provide call control signaling over the data network 12 for establishing call sessions. A "call session" refers generally to either a text-based, audio-based (e.g., voice), or a multimedia (e.g., audio, video, and/or text) session established between two or more telecommunications devices coupled to the data network 12 (or any other packet-based data network).

Once a call session has been established by the call control system 20, for example, the respective network telephone 17 or 18 participates in the communication of voice data (or other streaming data) over the data network 12 with the remote network telephone. The control path for the call session over the data network 12 goes through the call control system while the media path for the call session goes through the network telephone. The call control system is also capable of terminating the media path. In alternative embodiments, multiple network telephones may be associated with a single call control system. In yet other embodiments, the network telephones 17 and 18 may be functional units capable of operating on the data network 12 without the aid of call control system 20.

The telecommunications devices of the communications system 10 of FIG. 1 may include one or more cellular phones 22 (1–n) that communicate with a base station 24, which is coupled to the data network 12 through a controller 26 and a gateway 28. The controller 28 may also be coupled to a public switched telephone network (PSTN) 30 that supports a plurality of telephones 32 (1–m). The PSTN 30 may be coupled to the data network 12 through a gateway 34.

In accordance with one embodiment of the present invention, one or more of the telecommunications devices of the communications system 10 are capable of participating in real-time interactive communications with a remote telecommunications device. Some or all of the telecommunications devices in one embodiment may have a video camera that captures at least a portion of a calling party's (i.e., the caller's) body movements or physical attributes, such as the calling party's facial expressions. In one embodiment, as is described in more detail below, information associated with the calling party's facial expression, for example, is transmitted to the remote telecommunications device of the receiving party. As such, the receiving party is able to see an updated image of the calling party as the calling party is speaking. In one embodiment, the image is updated in a manner that requires lesser bandwidth than is otherwise required for transmission of video signals.

Figure 2:
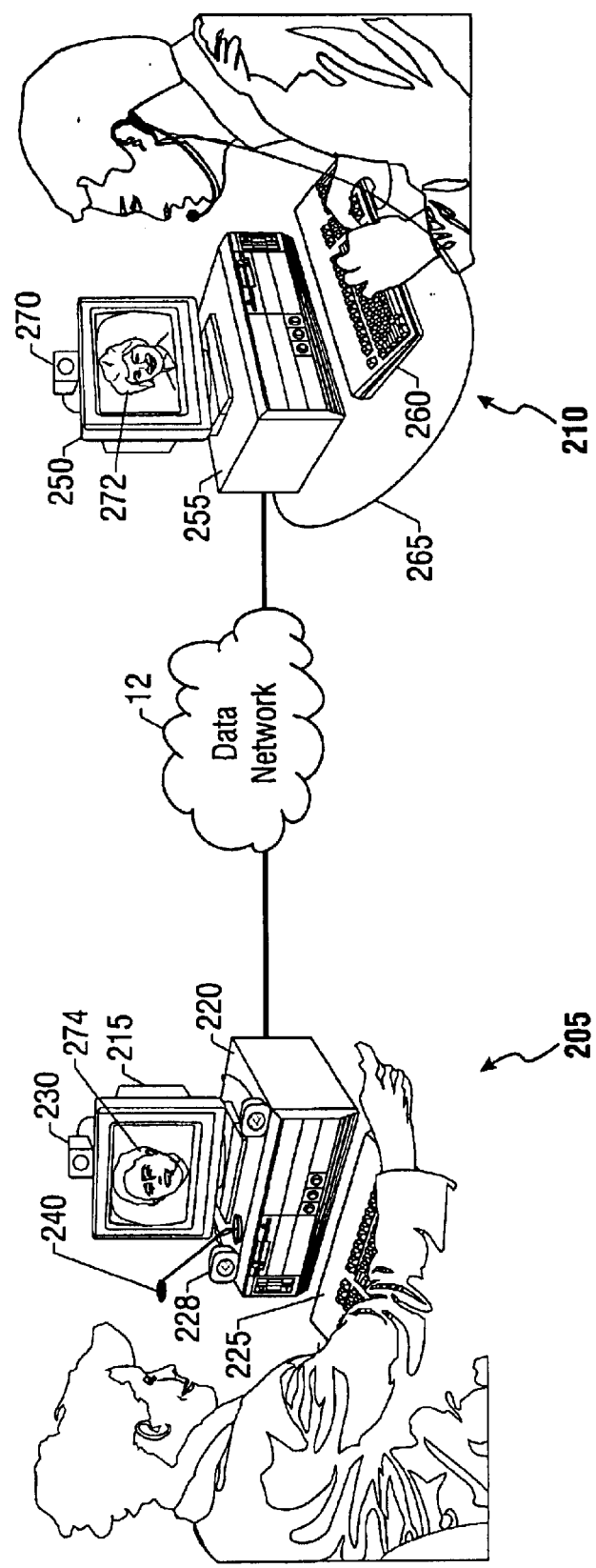
FIG. 2 is a block diagram of an exemplary communications system having two telecommunications devices in accordance with one embodiment of the present invention.

Referring now to FIG. 2, one embodiment of two telecommunications devices 205, 210 that are capable of engaging in real-time interactive communications with each other is provided. As utilized herein, "real-time interactive communications" refers to communications in which two or more parties are involved in an exchange of audio, video, and/or text data on a substantially real-time basis between two or more telecommunications devices. That is, in "real-time" communications, some interaction (in the form of exchange of text, audio, or video data) occurs between two or more participants who have acknowledged each other's participation. This is contrasted with electronic mail messaging, for example, in which a first participant sends a message over a data network to a second participant, usually with no acknowledgment or indication provided back to the first participant that the second participant has received the message or that the second participant is even at his or her terminal. In contrast, interactive communication involves a request followed by some acknowledgment that a called party has answered the call request (or not answered the call request) to enable the communication to be established in which participants exchange data (e.g., text, audio, and/or video).

Although not so limited, in the illustrated embodiment of FIG. 2, the data network is an EP network. One version of IP is described in Request for Comments (RFC) 791, entitled "Internet Protocol," dated September 1981. Other versions of IP, such as IPv6 or other connectionless, packet-switched standards may also be utilized in further embodiments. A version of IPv6 is described in RFC 2460, entitled "Internet Protocol, Version 6 (IPv6) Specification," dated December 1998. Packet-switched data networks such as IP networks communicate with packets, datagrams, or other units of data over the data networks.

For illustrative purposes, the two telecommunications devices 205, 210 are network phones, although one or more embodiments of the present invention may be implemented in the cellular phones (1-n) or the conventional phones (1-m). The term "network phone," as utilized herein, refers to any device, such as a computer, that is capable of electronic transmission of voice, fax, video, or other information between distant parties over the data network 12. The first network telephone 205 includes a display device 215, a central processing system 220, a keyboard 225, speakers 228, a video camera 230, and microphone 240. The second network telephone 210 similarly includes a display device 250, a central processing system 255, keyboard 260, a headphone set 265, and a video camera 270. Although components of the network telephones 205, 210, such as the keyboards 225, 260, video cameras 230, 270, and the like, are described as part of the network telephones 205, 210, such devices may in some embodiments be separate components are capable of interfacing with the network telephones 205, 210.

In one embodiment, the video cameras 230, 270 of the respective telecommunications devices 205, 210 are capable of capturing body movements and/or physical attributes (e.g., facial expressions, lip movements and the like) of the users of that network telephone 205, 210. The information associated with the body movements/attributes of each user is then transmitted to the remote network phone. At the remote network phone, in one embodiment, the information associated with body movements/attributes is used to animate a "still" picture of the caller so that the person receiving the call sees what appears to be an animated picture of the caller speaking. In accordance with one embodiment of the present invention this animation is accomplished without the need of transmitting an actual video signal of the caller speaking. For example, as can be seen FIG. 2, and as will be described in more detail below, after a call is initiated between the first and second network telephones 205, 210, an image 272 of the user of the first network telephone 205 appears on the display device 250 of the second network telephone 210. Similarly, an image 274 of the user of the second network telephone 210 appears on the display device 215 of the first network telephone 205.

The two network telephones 205, 210 coupled to the data network 12 may be capable of exchanging messaging to establish a SIP call session. SIP is part of the multimedia data and control architecture from the Internet Engineering Task Force (IETF). A version of SIP is described in RFC 2543, entitled "SIP: Session Initiation Protocol," dated in 1999. SIP may be used to initiate call sessions as well as to invite members to a session that may have been advertised by some other mechanism, such as by electronic mail, news groups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast.

Other standards may also be employed in further embodiments for controlling call sessions over the data network 12. Such other standards may be any other standard that provides for interactive, real-time audio or multimedia communications over the data network 12. One alternate standard is the H.323 Recommendation from the International Telecommunications Union (ITU).

Figure 3:
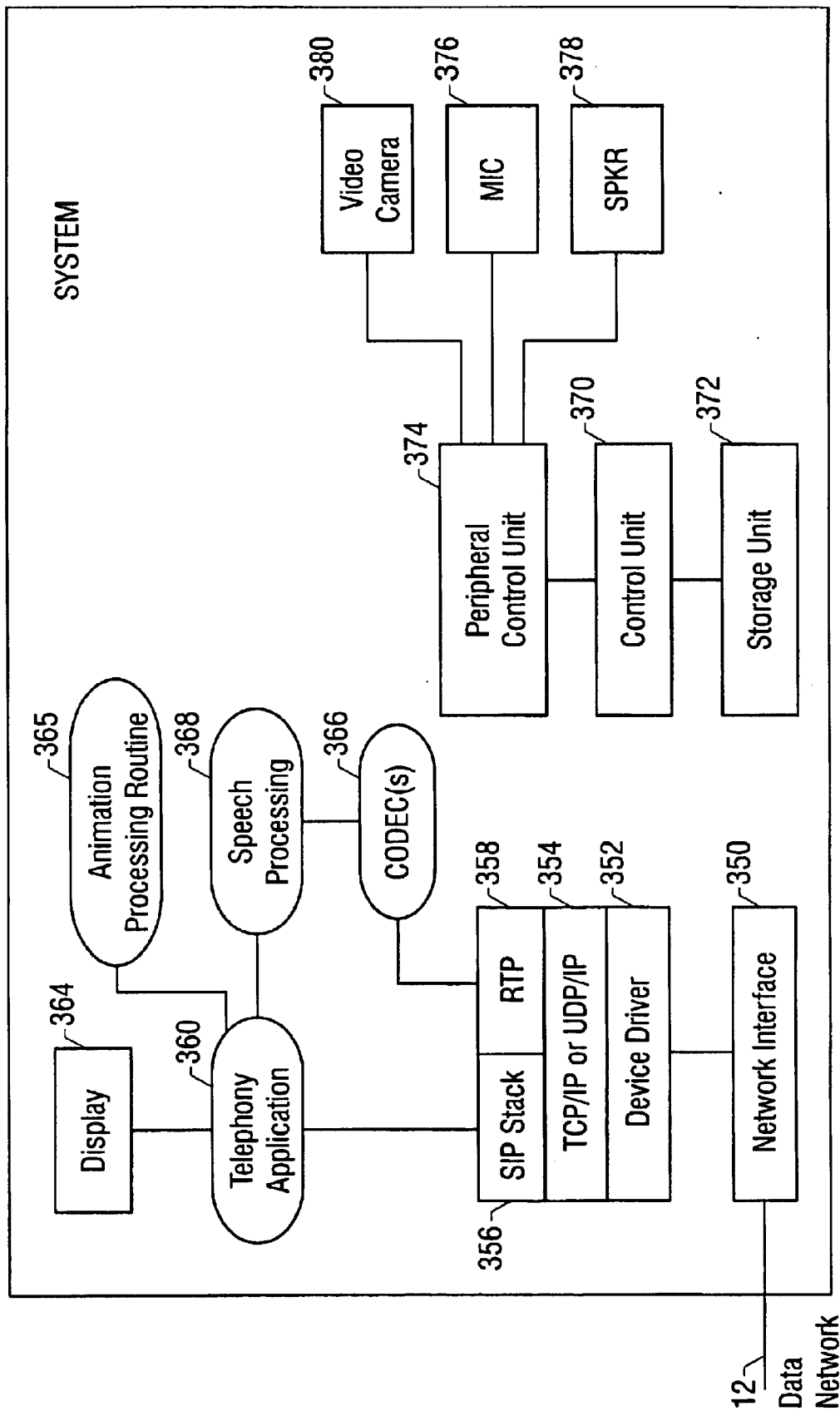
FIG. 3 is a block diagram of a telecommunications device that may be employed in the communications system of FIGS. 1 and 2 in accordance with one embodiment of the present invention.

Referring to FIG. 3, one embodiment of a network telephone 300 is illustrated. In the illustrated embodiment the network telephone 300 is implemented at the first network telephone 205 and the second network telephone 210 of FIG. 2. The network telephone 300 includes a network interface 350 that is coupled to the data network 12. Above the network interface 350 are several layers, including a device driver layer 352, a transport and network stack 354, a SIP stack 356, and an RTP layer 358. The transport and network stack 354 may include a TCP/IP or UDP/IP stack. TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network.

The SIP stack 356 is responsible for processing or generating SIP requests and responses communicated over the data network 12. The SIP stack 356 is in communication with a telephony application 360 in the network telephone 300. The SIP stack 356 is generally a state machine that provides parsing, processing, and generation of SIP requests and responses.

The telephony application 360 generates and processes control signals for transmission to establish call sessions over the data network 12 as well as to respond to received control signaling. The telephony application 360 may control the presentation of information (text or graphical) on a display 364 of the network telephone 300. Further, the telephony application 360 may include selectors for call control and indicators of the status of a call session. The telephony application 360, in one embodiment, may interface with an animation processing routine 365, which, as described in more detail below, maps the body movements or physical attributes of the user (while the user is engaged in the phone conversation) to a selected value that is then transmitted to the remote telecommunications device by the telephony application 360.

In the illustrated arrangement, the RTP layer 358 sends audio data to, or receives audio data from, an audio CODEC 366. The audio CODEC 366 encodes or decodes audio data. A speech processing routine 368 may perform further processing of voice data. In further embodiments, the audio CODEC 366 and the speech processing routine 318 may be omitted. The various software routines in the call network telephone 300, including the various layers 352, 354, 356, and 358 as well as CODECs 366 and the telephony application 362, are executable on a control unit 370. The control unit 370 is coupled to a storage device 372 in which instructions and data associated with the various software routines may be stored.

In the illustrated example arrangement, to provide an audio and video user interface to a user sitting at the network telephone 300, a peripheral controller 374 is coupled to a microphone 376 and a speaker 378 through which a user can talk or listen during a call session. The peripheral controller 374 may also be coupled to a headset. The peripheral controller 374 is coupled to a video camera 380 through which the body movements or physical attributes of the user may be tracked while the user is engaged in real-time interactive voice communications.

Figure 4:
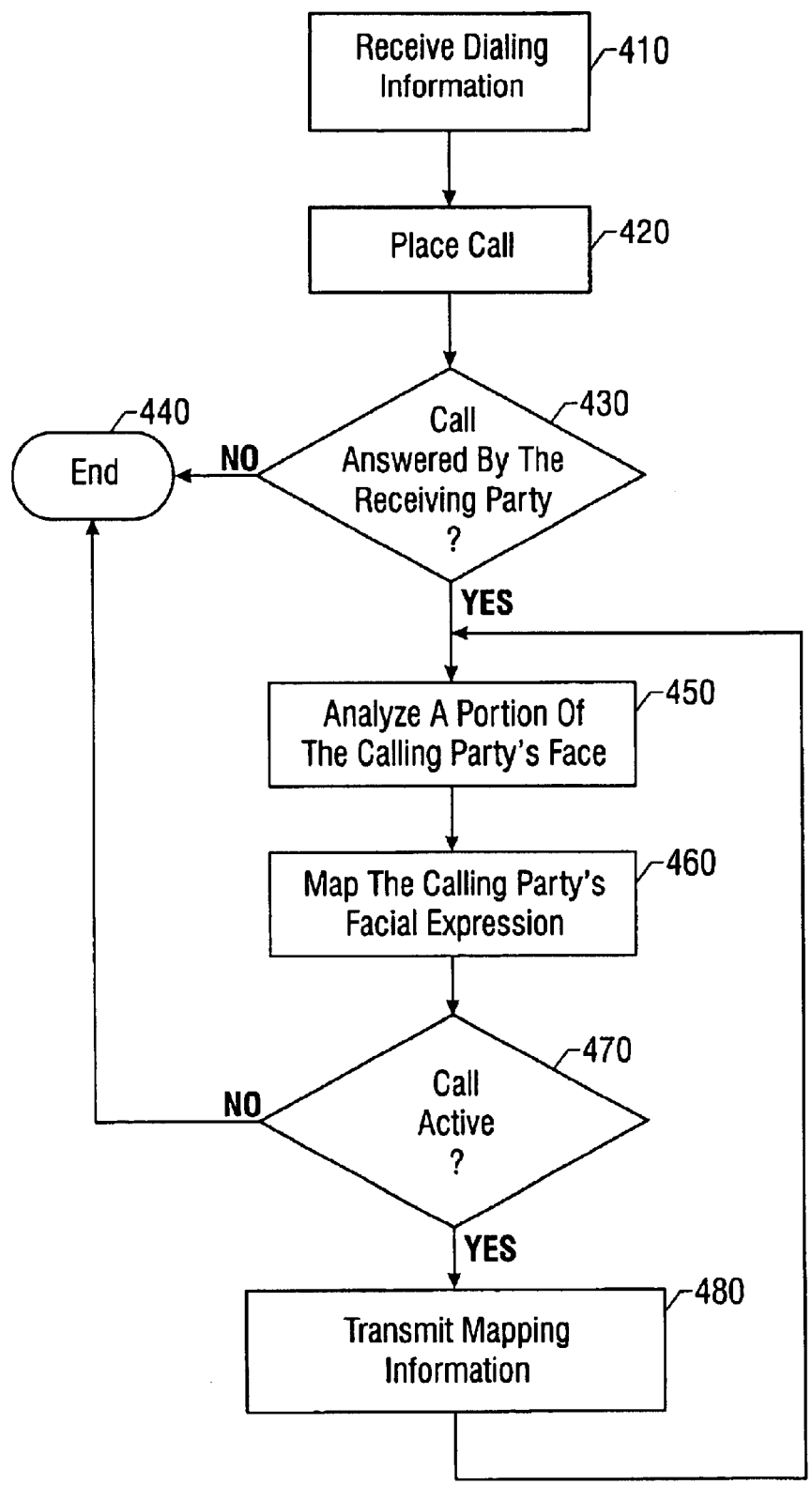
FIG. 4 is a flow diagram of a method in accordance with one embodiment of the present invention that may be implemented in the communications systems of FIGS. 1 and 2.

Referring now to FIG. 4, a method in accordance with one embodiment of the present invention is illustrated. The method of FIG. 4 is described in the context of placing a call from the first network telephone 205 to the second network telephone 210 of FIG. 2. The method of FIG. 4 begins at block 410, where the calling party provides the dialing information to the first network telephone 205 to contact the second network telephone 210. In one embodiment, the calling information may be a telephone number of the second network telephone 210. In an alternative embodiment, the calling r=information may be any information that identifies the second network telephone 210, such as an IP address.

At block 420, the telephony application 360 of the first network telephone 205 places the call to the second network telephone 210 based on the dialing information provided by the calling party at the block 410. At block 430, the telephony application 360 determines if the call placed at the block 420 is answered by the second network telephone 210. If the call is not answered, then, at block 440, the method of FIG. 4 is terminated.

If, at the block 430, it is determined that the second network telephone 210 has answered the call, then, at block 450, the telephony application 360 of the first network telephone 205 tracks one or more of the calling party's (i.e., the caller's) physical movements and/or attributes (e.g., facial expressions, lip movements, head movements). The particular physical attributes or movements that are tracked will typically be implementation specific. For example, in order to see an animated image of the calling party speaking at the receiving end, it is desirable to track the facial expressions, including lip movements, of the calling party at the transmitting end. For illustrative purposes, it is herein assumed that the facial expressions and lip movements are tracked so that a receiving party can see an animated image of the calling party such that the calling party's lips are substantially synchronized with the accompanying voice.

Lip movements can be tracked by the telephony application 360, for example, by using the video camera 380 (see FIG. 3) to focus on the calling party's (i.e., the speaker's) nose, since presumably the nostrils of the speaker are readily identified and tracked. Once the nose is identified, the camera 380 can focus on the speaker's lips, which are commonly located substantially underneath the nose.

At block 460, the animation processing routine 365 of the first network telephone 205 maps the calling party's facial expression that was tracked at the block 450 to a selected value or values. That is, in one embodiment, the animation processing routine 365 analyzes various points on the tracked facial expressions of the calling party to measure their distance and angles from the nostrils, where the various points can then be reduced to a plurality of face animation parameters (FCP). The FCP can be utilized, in one embodiment, to represent complex facial expressions, such as expressions of joy, sadness, anger, disgust, surprise, and the like. Simple numeric values can be assigned to various facial expressions, such as using number one (1) to represent joy, number four (4) to represent fear, and so forth.

An example of a software that is capable of mapping the calling party's facial expressions in accordance with one embodiment of the present invention is provided by a company called Face2Face. Face2Face software is based on the emerging Moving Picture Experts Group (MPEG-4) standard that enables animators to deliver full animation. In alternative embodiments, other mathematical equations or formulas may be used to map the calling party's facial expression to preselected values that can later be utilized to reconstruct (or simulate) same or similar facial expressions in accordance with one or more embodiments of the present invention.

At block 470, the telephony application 360 of the first network telephone 205 determines if the call is still active. If not, the method of FIG. 4 is terminated at the block 440. If the call is active, then, at block 480, the first network telephone 205 transmits the mapping information (also referred to as the animation information) that was calculated at the block 460 to the second network telephone 210. The second network telephone may then utilize the mapping information to construct a real-time image of the calling party. Thus, in accordance with one embodiment of the present invention, the second network telephone 210 is able to generate an animated image of the calling party based on the mapping information (e.g., numeric data), which requires little bandwidth, instead of the actual video signals, which typically require a large bandwidth. The steps from the blocks 450 and 480 may be repeated until the call at the block 470 is no longer active.

Figure 5:
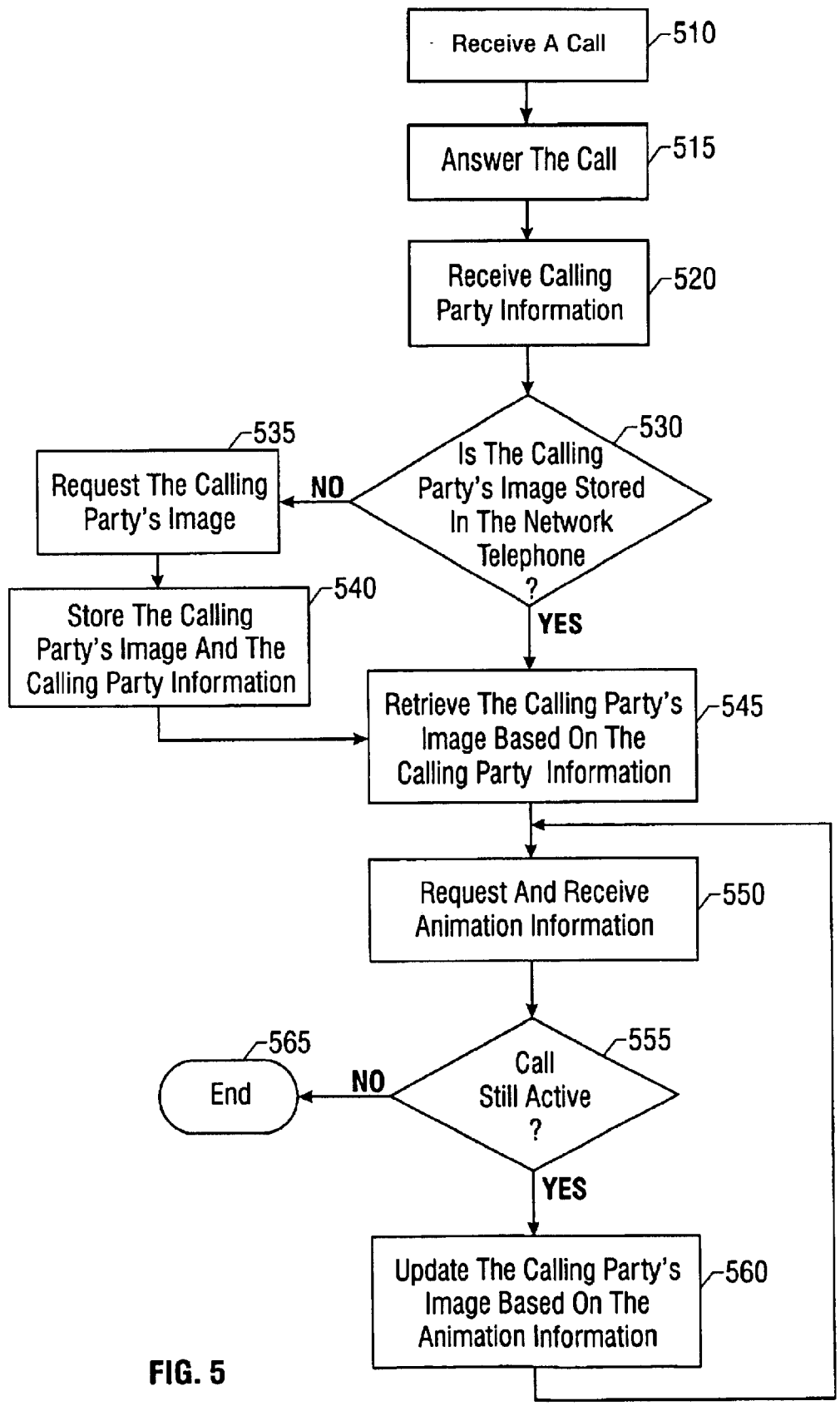
FIG. 5 is a flow diagram of a method in accordance with one embodiment of the present invention that may be implemented in the communications systems of FIGS. 1 and 2.

Referring now to FIG. 5, another embodiment of a method in accordance with the present invention is illustrated. For illustrative purposes, FIG. 5 is described in the context of the second network telephone 210 receiving a call from the first network telephone 205. The method of FIG. 5 begins at block 510, where the second network telephone 210 receives a call from the first network telephone 210. At block 515, the telephony application 360 of the second network telephone 210 answers the received call. At block 520, the telephony application 360 of the second network telephone 210 receives the calling party information from the incoming call. In one embodiment, the calling party information may be the name or telephone number of the calling party, or both. In an alternative embodiment, the calling party information may be the IP address of the calling party.

At block 530, based on the received calling party information, the telephony application 360 of the second network telephone 210 determines if an associated image of the calling party is stored locally. If no image is stored, then, at block 535, the telephony application 360 of the second network telephone 210 requests the calling party's image from the first network telephone 205. At block 540, the calling party's image is stored, along with the associated calling party information. In one embodiment, the image of the calling party may be stored in the storage device 372, or, alternatively, at another location that may be accessed by the telephony application 360. Once stored, the second network telephone 210 may expeditiously retrieve the calling party's image for subsequent calls.

At block 545, the second network telephone 210 retrieves the stored calling party's image based on the received calling party information. At block 550, the second network telephone 210 requests and receives animation information provided by the first network telephone 205. In an alternative embodiment, if the first network telephone 205 transmits the animation information along with the voice data, then it may not be IFS necessary for the second network telephone 210 to request the animation information. Instead, the second network telephone 210 may simply receive the transmitted animation information.

At block 555, the second network telephone 210 determines if the incoming call is still active. If yes, then, at block 560, the second network telephone 210 reconstructs the calling party's image based on the animation information and the stored image. That is, in one embodiment, the animation information provided by the first network telephone 205 is applied to the still image (or to its electronic representation) to reconstruct the physical attributes (e.g., facial expressions, lip movements, head movements, and the like) of the calling party. Thus, in accordance with one or more embodiments of the present invention, based on the still image and animation information, the second network phone 210 is able to display an animated image of the calling party. Therefore, the user at the second network phone sees the lips of the other user substantially synchronized with his or her voice, in one embodiment.

The steps from the block 550 to the block 560 are repeated until the incoming call is not active at the block 555. Once the incoming call is determined to be inactive at the block 555, the method of FIG. 5 terminates at block 565.

In alternative embodiments, receiving the calling party information (e.g., calling party name, phone number) may be optional. That is, in one embodiment, if the requested calling party information is not provided or available, the second network telephone 210 may simply request the caller image from the calling telephone. In an alternative embodiment, instead of requesting the calling party information, the second network telephone 210 may request the image of the calling party each time.

In one embodiment, it may be possible for users of both network telephones 205, 210 to see animated images of each other. That is, the method of FIG. 5 may also be implemented within the first network 205 so that it is able to receive animation information associated with physical attributes or movements of the user of the second network phone 210. Thus, both parties would be able to see animated images of each other in real-time.

Some embodiments may have one or more of the following advantages. An efficient method and apparatus are provided for participants of a telephone call to see animated images of each other while engaging in voice communications. The images of each participant may be updated using a lesser bandwidth than would otherwise be required for conventional video transmission.

As discussed, the various software layers, routines, or modules may be executable on control units (such as control unit 370 in FIG. 3). Each control unit may include a microprocessor, a microcontroller, a processor card (including one or more microprocessors or microcontrollers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage units. The instructions when executed by a respective control unit cause the corresponding system to perform programmed acts.

In the loading or transport process, data signals that are embodied in carrier waves (transmitted over telephone lines, network lines, wireless links, cables, and the like) may communicate the code segments, including instructions, to the terminal. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   establishing a racket-based call session with a remote party over an Internet Protocol network;
   receiving information associated with at least one physical attribute of the remote party during the packet-based call session, the received information representing movement of the at least one physical attribute, and the received information being different from video data of the at least one physical attribute;
   animating at least a portion of an image associated with the remote parts based on the received information;
   displaying the animated image during the packet-based call session;
   receiving, at a receiving device, at least one of a phone number and name associated with the packet-based call session;
   determining whether the image associated with the remote part is stored locally in the receiving device based on the at least one of the phone number and name associated with the packet-based call session;
   accessing the image stored locally in the receiving device in response to determining that the image is stored locally; and
   accessing the image from another device over the Internet Protocol network in response to determining that the image is not stored locally.

2. The method of claim 1, wherein receiving information associated with at least one physical attribute comprises receiving information associated with facial expressions of the party.

3. The method of claim 1, wherein receiving information associated with at least one physical attribute comprises receiving information associated with the lip movement of the party.

4. The method of claim 3, wherein animating at least a portion of an image comprises animating the lips of the image.

5. The method of claim 1, wherein receiving information associated with at least one physical attribute comprises receiving a numeric value associated with one of a plurality of facial expressions.

6. The method of claim 1, further comprising receiving voice signals during the packet-based call session.

7. The method of claim 6, wherein displaying the animated image comprises displaying an image of moving lips of the party that are substantially synchronized with the voice signals.

8. The method of claim 1 wherein establishing the packet-based call session over an Internet Protocol network comprises establishing the packet-based call session over a wireless link.

9. The method of claim 1, wherein animating the image based on the received information is based on information consuming less bandwidth than the video data.

10. The method of claim 1, wherein establishing the packet-based call session comprises communicating Session Initiation Protocol messaging to establish the packet-based call session.

11. An apparatus, comprising:
    an interface adapted to receive voice information and animation information in a packet-based call session from a party, wherein the animation information is representative of a facial expression of the party and the animation information is different from video data of thee facial expression;
    at least one storage device to store:
       an electronic representation of an image of the party; and
    a controller adapted to:
       communicate Session Initiation Protocol messaging over a packet-based network to establish the packet-based call session;
       animate at least a portion of the electronic representation of the image based on the animation information received in the packet-based call session;
       display the animated image during the packet-based call session;
       receive calling party information associated with the call session, wherein the calling party information is received over the packet-based network;
       receive Session Initiation Protocol call setup messaging over the packet-based network from a device associated with the pasty;
       transmit Session Initiation Protocol messaging over the packet-based network in response to the call setup messaging;
       access the image based on the calling party information;
       determine whether the image is stored locally in the apparatus;
       in response to determining that the image is stored locally, access the image locally; and
       in response to determining that the image is not stored locally, access the image over the packet-based network.

12. The apparatus of claim 11, wherein the controller is adapted to animate lips in the image that are substantially synchronized with the voice information.

13. The apparatus of claim 11, wherein the animation information comprises a numeric value associated with one of a plurality of facial expressions.

14. The apparatus of claim 11, wherein the controller is adapted to:

track physical attributes of a user of the apparatus; and map the physical attributes of the user to a selected value.

15. The apparatus of claim 14, wherein the controller is adapted to transmit the selected value to a remote telecommunications device.

16. The apparatus of claim 11, wherein the interface is adapted to receive the voice information and the animation information in a packet-based call session established over a wireless link.

17. The apparatus of claim 11, wherein the animation information consumes less bandwidth than the video data.

18. The apparatus of claim 11, wherein the controller comprises a Session Initiation Protocol stack to communicate the Session Initiation Protocol messaging.

19. The apparatus of claim 18, further comprising a Real-Time Protocol component to communicate real-time messaging during the call session.

20. An article comprising at least one machine-readable storage medium containing instructions that when executed cause a processor to:

communicate Session Initiation Protocol messaging to establish a packet-based call session;

receive a voice signal from a participant during the packet-based call session;

receive information representing at least a portion of a face of the participant during the packet-based call session, the received information to indicate movement of at least the portion of the face of the participant, the received information different from video data of at least the portion of the face;

animate an image based on the received information so that movement of the face is substantially synchronized with the voice signal;

receive calling party information associated with the participant;

retrieve the image based on the received calling party information;

determine whether the image is stored locally in a device in which the processor is located;

in response to determining that the image is stored locally, access the image in the device; and in response to determining that the image is not stored locally, access the image from another device over a packet-based network.

21. The article of claim 20, wherein the instructions when executed cause the processor to retrieve the image based on at least one of a phone number and name of the participant.

22. The article of claim 20, wherein the instructions when executed cause the processor to retrieve mapping information in the call session, wherein animating the image is based on the mapping information.

23. The article of claim 20, wherein the instructions when executed cause the processor to display the animated image.

24. The article of claim 20, wherein the received information consumes less bandwidth than the video data.

* * * * *

UNITED STATES PATENT AND TRADEMARK OFFICE
CERTIFICATE OF CORRECTION

PATENT NO. : 6,867,797 B1
DATED : March 15, 2005
INVENTOR(S) : Phillip S. Pound

It is certified that error appears in the above-identified patent and that said Letters Patent is hereby corrected as shown below:

Column 9,
Line 38, "racket" should be -- packet --;
Line 47, "parts" should be -- party --;
Line 54, "part" should be -- party --.

Column 10,
Line 35, after "party" insert -- , --;
Line 37, "thee" should be -- the --.

Signed and Sealed this

Twenty-fourth Day of May, 2005

JON W. DUDAS
*Director of the United States Patent and Trademark Office*